(12) United States Patent
Lindholm

(10) Patent No.: US 6,766,159 B2
(45) Date of Patent: Jul. 20, 2004

(54) ALPHA TAGGING AND TYPE INDICATION OF EMERGENCY CALL NUMBER

(75) Inventor: Rune Lindholm, Sottunga (FI)

(73) Assignee: Nokia Mobile Phones Ltd., Espoo (FI)

( * ) Notice: Subject to any disclaimer, the term of this patent is extended or adjusted under 35 U.S.C. 154(b) by 448 days.

(21) Appl. No.: 09/803,677

(22) Filed: Mar. 9, 2001

(65) Prior Publication Data

US 2001/0051514 A1 Dec. 13, 2001

Related U.S. Application Data

(60) Provisional application No. 60/188,649, filed on Mar. 10, 2000.

(51) Int. Cl.[7] ............................................. H04M 11/04
(52) U.S. Cl. ................................ 455/404.1; 455/404.2; 455/414.2; 379/216.01
(58) Field of Search ........................... 455/404.1, 404.2, 455/566, 414.2, 414.4, 418, 521, 558, 564, 565; 379/216.01, 45

(56) References Cited

U.S. PATENT DOCUMENTS

5,719,929 A    2/1998  Menard

FOREIGN PATENT DOCUMENTS

| WO | 9916181 | 4/1999 |
|----|---------|--------|
| WO | 0048409 | 8/2000 |

OTHER PUBLICATIONS

Japanese JP 11–187455 and English abstract.
From *3rd Generation Partnership Project*; Technical Specifications: 3G TS 21.111, V3.1.0 (Apr. 2000), Group Terminals; USIM and IC Card Requirements (Release 1999).
3G TS 22.101, V3.8.0 (Dec. 1999), Group Services and System Aspects Service Aspects; Service Principles.
3G TS 31.101, V3.0.0 (Jan. 2000), Group Terminals; UICC–Terminal Interface; Physical and Logical Characteristics.
3G TS 31.102, V3.0.0 (Jan. 2000), Group Terminals; Characteristics of the USIM Application.
3G TS 31.110, V3.0.0 (Jan. 2000), Group Terminals; Numbering System for Telecommunication IC Card Applications.

*Primary Examiner*—Edward F. Urban
*Assistant Examiner*—Blane J. Jackson

(57) ABSTRACT

A user of a mobile terminal is enabled to call emergency services in a wireless telecommunications network, whether or not the user is in a foreign country. If the user signals for emergency help by sending an emergency call code to the base station, the user is connected to an emergency center corresponding to the user's base station. The user may also be provided with an emergency services display. Further, the user may be connected to a specific type of emergency center corresponding to the user's base station, if the user signals for the specific type of emergency center by sending a service category to the base station. These emergency signals sent from the mobile terminal to the base station are location-independent, and therefore work well at an international level.

33 Claims, 4 Drawing Sheets

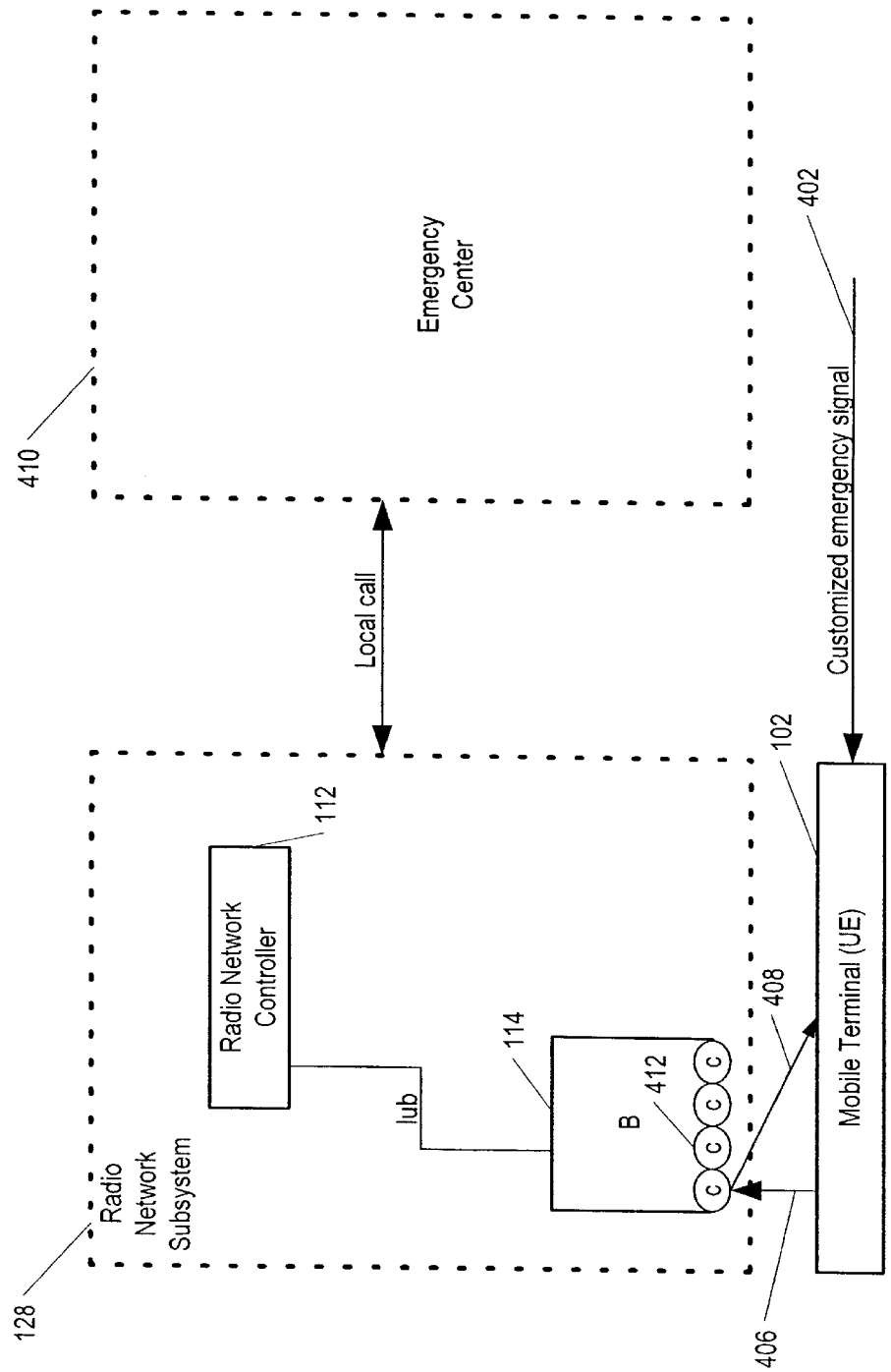

ALPHA TAGGING AND TYPE INDICATION OF EMERGENCY CALL NUMBER

CROSS-REFERENCE TO RELATED APPLICATIONS

This Application claims benefit of U.S. Provisional Application Serial No. 60/188,649 filed Mar. 10, 2000, the contents of which are incorporated herein by reference.

BACKGROUND OF THE INVENTION

1. Technical Field of the Invention

The invention relates generally to the field of accessing emergency services telephonically using a wireless telecommunications network, and more particularly to emergency telephone access at an international level.

2. Description of Related Art

In the Global System for Mobile Communications (GSM), an emergency call code is defined for making emergency calls. Typically, an emergency number is used to indicate to the mobile terminal that an emergency call must be initiated, and then an emergency call setup is performed, the setup being specialized in order to get priority in the network. The particular emergency number actually dialed by the user is of little importance, as long as the emergency is recognized and indicated in the call setup, and the call is then routed to an emergency center based on the call setup.

It is common for mobile terminals to include removable smart cards (UICC) which contain a Universal Subscriber Identity Module (USIM). The UICC is an IC card, and thus the UICC holds an integrated circuit containing subscriber data, end user data, authentication data, and/or application data for one or more applications. Emergency call codes are stored in the UICC in a data file named "Emergency Call Codes" (EFecc). This elementary file can contain one or more emergency call codes. When the user dials a number on the keyboard (e.g. 911) it is compared with the number stored in $EF_{ECC}$. If the number entered from the keyboard matches a number in $EF_{ECC}$, the call is set up as an emergency call, regardless of what that particular number is.

The structure of the data file ($EF_{ECC}$) is exemplified by the following table:

| Identifier: | Structure: transparent | | Mandatory |
|---|---|---|---|
| File size: 3n (n > 1) bytes | | Update activity: low | |
| Access Conditions: | | | |
| READ | ALW | | |
| UPDATE | ADM | | |
| DEACTIVATE | ADM | | |
| ACTIVATE | ADM | | |
| Bytes | Description | M/O | Length |
| 1–3 | Emergency Call Code 1 | M | 3 bytes |
| 4–6 | Emergency Call Code 2 | O | 3 bytes |
| (3n-2) - 3n | Emergency Call Code n | O | 3 bytes |

This table can be found in technical specification 3G TS 31.102. This $EF_{ECC}$ data file contains a set of emergency numbers, maximum 6 digits. The intention with this data file is that it contains various different national emergency call numbers. Typically, up to five emergency call codes have been contained in an $EF_{ECC}$ (i.e. n=5). If the serving network does not recognize any of the "n" emergency call codes, then it is usual for the call to be routed to default emergency numbers. In case there is no match with the dialed number and the numbers stored in the $EF_{ECC}$, the mobile device checks the default emergency numbers that are stored internally in the mobile device for a match. If there is a match, then the call is set up as an emergency call. These default numbers are also available when a USIM is not present. This is discussed in technical specification 3G TS 22.101. In this related art system, various emergency signals may be sent from a mobile terminal, but those emergency signals will all have the same purpose: to connect the user to a particular emergency center via a particular phone number.

The user is familiar with the national numbers, like 911 in the U.S. Dialing a national emergency call number, when roaming internationally, automatically sets up an emergency call to an emergency center in the roaming network. The actual number entered is in this case not important as long as it matches an entry in the emergency call code data file. In other words, 911 could be dialed by the user even in a country that does not recognize 911 as an emergency number, because the terminal and network know to dial the correct number.

If there are different particular numbers used for emergency calls to the police, ambulance and fire brigade, that can be indicated by sending the particular dialed number to the network during the emergency call setup. This may work on a national basis, where each emergency number is uniquely defined.

In case of a roaming situation across international borders, however, the country where the user is travelling may have a different emergency call number scenario from the home country. The roaming network cannot, based on the number submitted with the emergency call setup, determine the type of emergency service requested. As a worst case, the same numbers may be used in the roaming network and the home network for emergency calls, but with different meanings. As an example, the ambulance emergency call number in the user's home network may be the same as the emergency call number for the fire brigade in the roaming network. This makes it impossible to use the dialed emergency number for call routability, because the call may end up at the wrong emergency center.

This problem has not been solved on an international level. On a national level, the problem has been solved by using different emergency numbers. As the same number may be used in different countries for different emergency services, it is currently impossible to guarantee the correct emergency service. When roaming internationally, since the number dialed is based on a national emergency numbering scenario stored in the USIM (which is located in the terminal's smart card), the dialed number submitted at the emergency call setup may route the emergency call to a totally different emergency service. In other words, the dialed number is interpreted according to the emergency numbering scenario in the roaming network, which may be a different scenario from the scenario stored in the USIM.

International agreement about a coding scenario may be able to indicate which type of emergency service is needed based on the number dialed. Then the emergency number dialed could be converted to the corresponding emergency service in the roaming network. Until such an agreement, an emergency number may indicate a different type of emergency in different countries, and some countries will not have specific numbers for different types of emergencies. Also, some terminal users will not want to memorize more than one number even in their home country.

BRIEF SUMMARY OF THE INVENTION

When roaming internationally, it will be convenient for the user to be able to use the emergency numbers that she is accustomed to using in order to reach emergency services of different types. It will also be convenient for the user to obtain display information about the various emergency services available, prior to actually contacting those emergency services. This invention thus enhances the use of emergency numbers in a mobile telecommunications network, allowing the user to make a variety of emergency calls having a plurality of different functions.

According to this invention, an emergency call is set up in a special way, in the context of the mobile communication network. The emergency call is routed to the closest emergency center(s), depending upon what kind of an emergency is involved.

This invention permits an alpha identifier to be added to the emergency call number. This alpha tag allows the user to access a display in order to identify the type of emergency center to which the emergency call will be connected. The display information is stored in the USIM within the mobile phone. Furthermore, the invention defines a service category that can be used in the network to route the emergency call to the appropriate emergency center (police, ambulance, fire brigade, etc.).

The alpha tagging solves the problem of indicating to the user which emergency service can be called. The service category solves the problem of giving a location-independent indication to the network of what type emergency service is requested.

The invention discloses a new and unique method for providing an emergency call by a user of a mobile phone to a mobile phone network, comprising two unique steps: (1) inputting an emergency call number to a mobile phone; and (2) attaching to the emergency call number a location-independent emergency service category that is identified by each mobile network in the same way regardless of country. The location-independent emergency service category (also known as a call type indicator) identifies emergencies such as general rescue, police ambulance, fire, or a combination thereof. The emergency call number is typically provided by a user in an emergency situation where there is a need for one or more of the aforementioned emergency services. Another step of this method includes attaching to an emergency call code an emergency call code alpha tag identifier so that once a user has dialed an emergency number the user may scroll a display of the mobile phone for available emergency services, for example, in case the emergency number entered did not correspond to a desired emergency service. The entering of the emergency number would act as a trigger to view emergency services numbers to the user. After a predetermined time, an emergency call having a location-independent emergency service category attached thereto would be provided to the mobile network if an alternative emergency call number is not selected by the user.

This method also includes automatically routing the emergency call to a corresponding emergency call center in the mobile network. The method further includes maintaining an emergency call code data file in the mobile phone with the location-independent emergency service categories, the emergency call code, and/or the emergency call code alpha tag identifier.

BRIEF DESCRIPTION OF THE DRAWINGS

FIG. 4 illustrates a system according to an embodiment of the present invention.

DETAILED DESCRIPTION OF THE INVENTION

Figure 1:
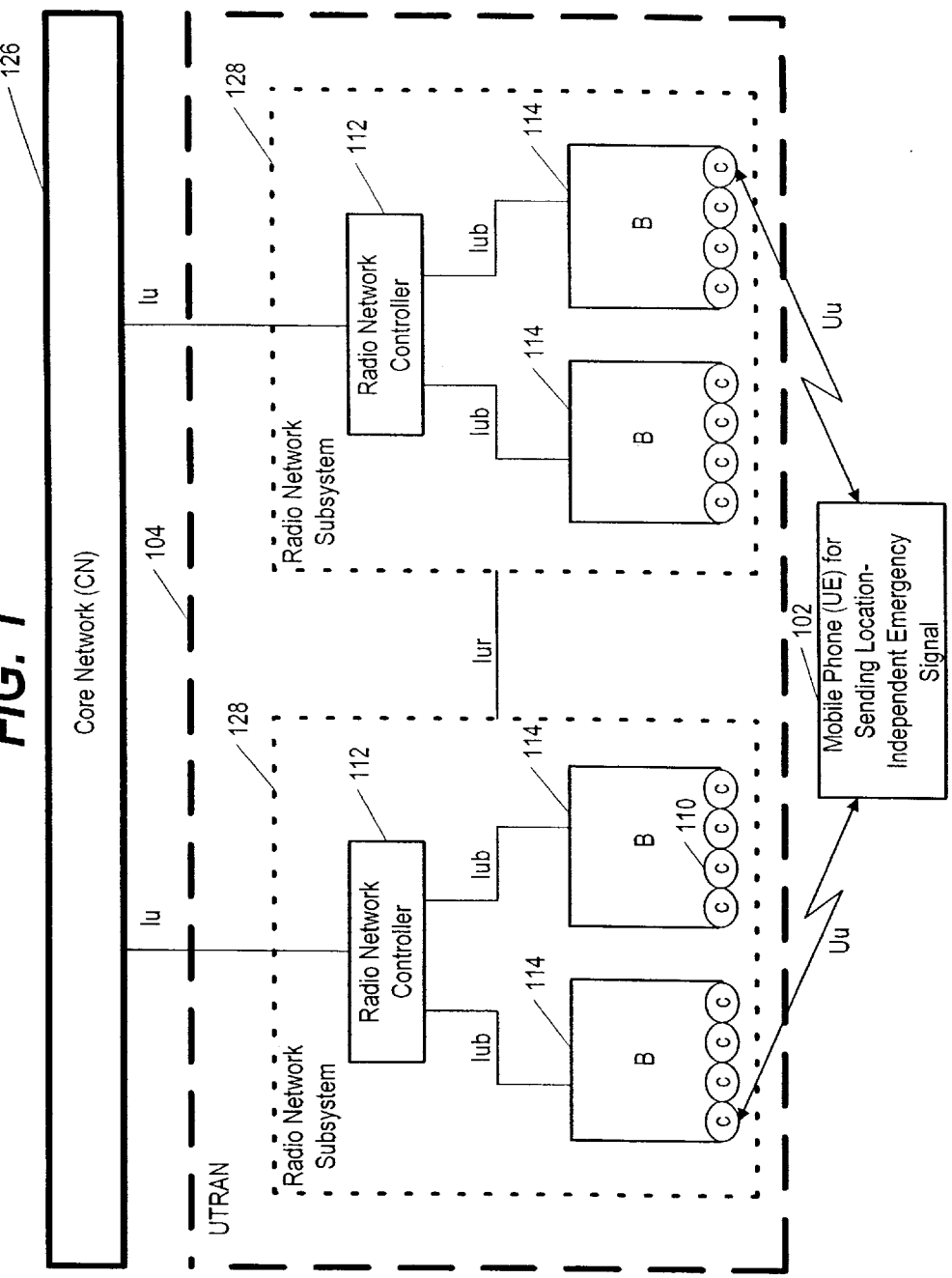
FIG. 1 shows an example of a wireless telecommunications architecture in which the present invention can operate.

In order to explain best mode embodiments of the present invention, it will be useful to consider the telecommunications infrastructure in which the invention operates. This is exemplified by FIG. 1, which shows the structure of a wireless system according to the 3GPP Telecommunications System (3GPP is synonymous with WCDMA or wideband code division multiple access, and with GSM or global system for mobile communication). As can be seen in FIG. 1, the 3GPP architecture consists of user equipment 102 (UE which is herein synonymous with "mobile device," "terminal equipment" and "emergency-equipped mobile phone"), the 3G Terrestrial Radio Access Network 104 (UTRAN), and the Core Network 126 (CN). The air interface between the UTRAN and the UE is called Uu, and the interface between the UTRAN and the Core Network is called Iu. The UTRAN consists of a set of Radio Network Subsystems 128 (RNS), each of which has geographic coverage of a number of cells 110 (C). The interface between the subsystems is called Iur. Each Radio Network Subsystem 128 (RNS) includes a Radio Network Controller 112 (RNC) and at least one Node B 114, each Node B having geographic coverage of at least one cell 110 (a Node B is synonymous with a base station). As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop tall towers or preferably at less conspicuous locations). The RNC 112 has overall control of the logical resources of each Node B 114 within the RNS 128, and the RNC 112 may also be responsible for handover decisions which entail switching a call from one cell to another or between radio channels in the same cell.

According to a best embodiment of the present invention, a location-independent emergency service category can be attached to the emergency call number. This service category is identified by each network in the same way regardless of location or country. Call types like general emergency, police, ambulance, fire brigade, and/or rescue are defined in the corresponding coding.

In addition to this, the contents of the emergency call code data file ($EF_{ECC}$) is modified in order to allow an alpha tag to be attached to an emergency call code. This means, for example, that the user, once she has dialed a number in an emergency, can scroll the display for available emergency services, for example if the entered number did not correspond to the required emergency service category. In other words, entering an emergency number which does not go through acts as a trigger to display the available emergency service numbers to the user, along with other emergency information. If a displayed alternative is not selected by the user within a defined time, the call is set up to an emergency number and the emergency service category (for example a general emergency category) is indicated to the network.

According to this embodiment of the best mode, the network, based on the emergency service category indicated in the call setup, is able to route the emergency call to the corresponding emergency center. Thus, the mobile terminal translates user input into a location-independent (i.e. internationally standardized) code which is sent to the network, and then the network translates the code into whatever numbers are necessary in the local geographic region. The emergency number dialed by the user in this case can be delivered to the network as well, although this is not essential.

The following modifications, for instance, could be made to the $EF_{ECC}$ on the UICC, as part of implementing this invention:

| Identifier: | Structure: linear fixed | | Mandatory | |
|---|---|---|---|---|
| Record size: X + 6 bytes | | Update activity: low | | |
| Access Conditions: | | | | |
| READ | ALW | | | |
| UPDATE | ADM | | | |
| DEACTIVATE | ADM | | | |
| ACTIVATE | ADM | | | |
| Bytes | Description | | M/O | Length |
| 1 to 3 | Emergency Call Code 1 | | M | 3 bytes |
| 4 to X + 4 | Emergency Call Code Alpha Identifier | | O | X bytes |
| X + 5 to X + 6 | Emergency Service Category | | M | 1 byte |

The main thing to notice about this $EF_{ECC}$ is that, under the description heading, the following items are listed:

| Description |
|---|
| Emergency Call Code 1 |
| Emergency Call Code Alpha Identifier |
| Emergency Service Category |

In order to more completely describe a best mode embodiment of the present invention, let us suppose that a U.S. citizen ("Pat") has an emergency in some arbitrary country. Pat may want to call a general emergency number, or she might prefer to directly call the specific type of emergency service that she needs.

According to the present invention, Pat can be located anywhere in the world, and she can simply dial a particular number established in her smart card (e.g. 911) in order to reach the local general emergency center. The smart card provides a location-independent emergency service category for Pat's "911" emergency call code, and then the radio network subsystem retranslates the location-independent emergency signal into the local general emergency telephone number corresponding to the local geographic area where Pat's base station is located. Then Pat is patched through to the local emergency personnel.

However, suppose Pat wants to find out what kind of emergency services are available before calling a general emergency center. Pat's mobile phone is structured and programmed so that she can dial a particular number (e.g. *911) in order to bring up a display of available emergency centers. This information has been stored in Pat's mobile phone, for example in the USIM, and can be accessed using the alpha tagging.

The specific numbers just mentioned are examples only, and people native to different countries might choose different numbering schemes; their mobile terminals could be programmed accordingly. However, the service category sent from the mobile terminal to the network would be location-independent; i.e. one service category would always indicate fire, one service category would always indicate police, et cetera, regardless of what country the user is located in.

When Pat chooses to access the emergency display, or is given the display for some other reason, then Pat can select a particular emergency number to call. The display's user interface can allow Pat to simply click on the particular facility or facility phone number that she desires to call, and the result would then be the same as if Pat had entered particular emergency phone numbers using the keyboard. The display may have multiple layers of information, and the display information which is read from the USIM may be updated by the network operator if there are changes to the national scheme.

The mobile terminal may additionally or alternatively be equipped with an emergency button and/or other trigger (such as a voice trigger or a trigger related to air bag deployment) that automatically dials for general emergency assistance; thus, Pat would not necessarily have to use the keyboard to get help. An emergency button could initiate a call for an ambulance (A911), or alternatively could initiate a general emergency call (911), although the former type of call may be preferable, because especially in medical emergencies a mobile terminal user will prefer not to study a keyboard and carefully choose the digits to dial.

Whenever Pat makes any kind of emergency call, it is possible for the radio network subsystem to be programmed so as to initiate an additional separate call or message which is automatic and computer-generated; this automatic message could be sent from the radio network subsystem to a general emergency center corresponding to the base station that is communicating with Pat over the wireless interface (thus there could be two emergency calls instead of just one). The automatic message would, for example, report that Pat initiated an emergency wireless call, report the specific type of emergency center requested by Pat if any, report Pat's mobile phone number, report where the base station is located, and report the time of Pat's emergency wireless call. This automatic message would be in the local language, and therefore would help to ensure that Pat receives the help she needs, even if she cannot speak the local language. Even if Pat does speak the local language, the automated message could still be helpful to the authorities by providing information about Pat's location and the type of emergency.

Additionally, the mobile phone could be designed so as to emit a distress signal whenever a call is placed to an emergency center, so that emergency personnel would be able to locate the mobile phone user once the emergency personnel are near the base station. The beacon could be turned off by simply turning off the mobile phone's power. Details about the distress signal (e.g. frequency and signal strength) could be part of the automatic computer-generated report from the radio network subsystem to the general emergency center.

Figure 2:
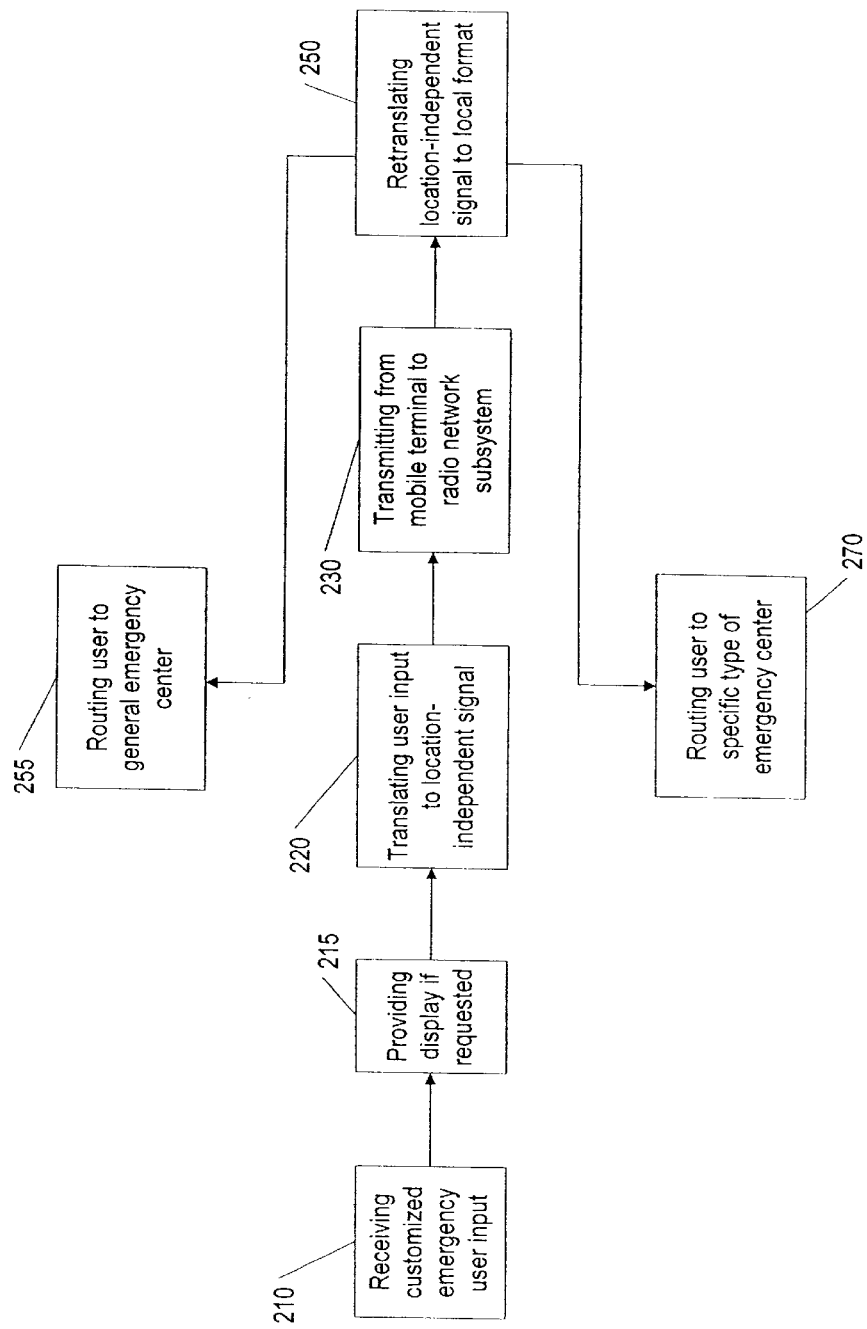
FIG. 2 is a flow chart illustrating an embodiment of the present invention.

The method according to a best mode of the present invention is shown in FIG. 2. This method allows a user of a mobile terminal to make an emergency call to the radio network subsystem 128 (shown in FIG. 1) in a wireless telecommunications network 104 (see FIG. 1), when the user is located in a foreign country or a home country. The first step is receiving 210 customized emergency user input at a mobile terminal. In other words, the mobile terminal can be programmed so as to customize the particular keystrokes necessary to make an emergency call. For example, a U.S. user might prefer numbers like 911, compared to Japanese citizens who might prefer numbers like 110, 118, and 119. This required emergency user input does not change when the mobile terminal is taken across an international border, so, for example, the Japanese citizen who visits the United States can still dial numbers like 110, 118, and 119 on her mobile terminal. The emergency user input is selected from a plurality of allowed emergency user inputs, meaning that the present system offers more options than simply dialing 911. As discussed already, other options include dialing for specific types of emergency assistance.

Following input by the user, the mobile device may display, in a step 215, emergency service options, and the user may then select one of these options; these options come from alpha tag information contained in the $EF_{ECC}$ which is located in the USIM. The next step is for the mobile device to translate 220 the emergency user input into a location-independent emergency signal corresponding to the emergency user input, wherein the location-independent emergency signal is included within a plurality of different allowed location-independent emergency signals having different respective functions, such as calling for an ambulance, calling for the fire department, calling for police, or calling for a display of local emergency information. Then the mobile terminal transmits 230 information contained in the location-independent emergency signal from the mobile terminal to a radio network subsystem over an air interface, the radio network subsystem including a base station with which the mobile terminal is in direct wireless communication.

Then the radio network subsystem (RNS) may retranslate 250 the information contained in the location-independent emergency signal, in order to obtain a format corresponding to the local area in which the base station is located. In other words, in order for the RNS to establish a connection with an emergency center, it may be necessary for the RNS to determine and dial a normal local telephone number for the emergency center. Then the user call can be routed 255 to a general emergency center which corresponds to a base station that is communicating with the user over a wireless interface, or the RNS routes 270 the user call to a specific type of emergency center which corresponds to a base station that is communicating with the user over the wireless interface.

Figure 3:
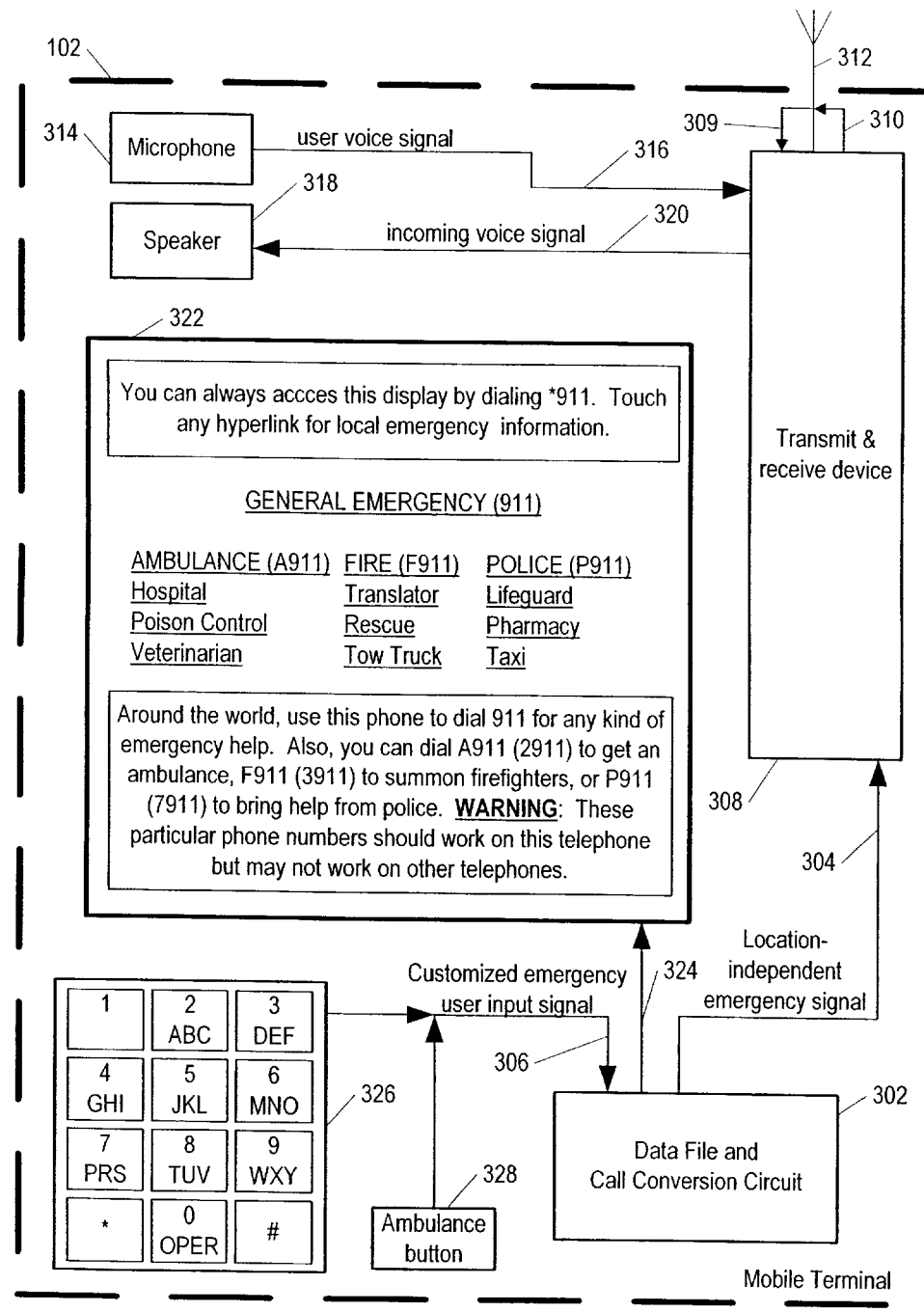
FIG. 3 show a mobile terminal according to an embodiment of the present invention.

FIG. 3 illustrates a mobile terminal designed to implement the present method, according to an embodiment of the best mode. FIG. 3 is illustrative of the mobile terminal 102, and also of the method which it implements as already discussed.

The mobile terminal 102 includes a data file and call conversion circuit 302 which may be a smart card, for example, containing an $EF_{ECC}$ file. This circuit provides a location-independent emergency signal 304, which means that the various different formats of this signal 304 are standardized, but does not mean that this signal 304 will always be the same (i.e. the user can determine which of the location-independent formats is contained in the signal 304). The circuit 302 is responsive to a customized emergency user input signal 306 having a magnitude indicative of a user seeking selected emergency assistance, and the required emergency user input does not change when the mobile terminal 102 is taken to another country.

The mobile terminal includes transmit and receive device 308, which is responsive to a raw incoming transmitted signal 309 received via an antenna 312, and the transmit and receive device 308 is also responsive to the location-independent emergency signal 304. The transmit and receive device 308 is, of course, for providing an outgoing transmission signal 310. The customized emergency user input signal 306 is selected from a plurality of allowed emergency user input signals that can be programmably customized to suit the user, meaning, for example, that the user will have a keyboard numbering scheme that the user prefers for emergency situations. Mobile terminals marketed in a particular country can be preprogrammed in order to accommodate the numbering schemes most popular in that particular country. The location-independent emergency signal 304 is included within a plurality of different allowed location-independent emergency signals having different respective functions which are effectuated by the outgoing transmission signal 310. Therefore, not only can users punch in a variety of different phone numbers to obtain an identical result, but also they can obtain different results if the numbers are properly selected.

As is customary for a mobile terminal, the terminal shown in FIG. 3 includes a microphone 314, responsive to audio input from the user, for providing a user voice signal 316. Likewise, FIG. 3 also shows a speaker 318, responsive to an incoming voice signal 320, for providing audio output to the user. The incoming voice signal 320 contains information from a general emergency center corresponding to a base station that is communicating with the user over the wireless interface.

The mobile terminal 102 shown in FIG. 3 also includes a display screen 322, which is responsive to a display signal 324 from the data file and call conversion circuit 302, and the display screen 322 is for providing the user with at least one emergency services display containing emergency information stored in the data file and call conversion circuit 302. This display will occur if the customized emergency user input signal 304 involves an alpha tag (e.g. if the user dials *911). A sample display is shown in FIG. 3, and the display may allow the user to activate various hyperlinks to obtain particular types of emergency assistance/information. A useful feature would be to be able to click on a particular item on the display so that the call will be put through automatically, without dialing, to emergency assistance and/or information.

If the user wants to contact a specific type of emergency center, then that is allowed by the mobile terminal 102. In that case, the location-independent emergency signal 304 includes an emergency service category indicating the type of emergency call.

As is clear from FIG. 3, the mobile terminal has a keypad 326 for providing the customized emergency user input signal 306 (in response to customized emergency input). However, the customized emergency user input signal 306 may alternatively be provided by an ambulance button 328.

FIG. 4 shows a systematic overview of the present invention according to a best mode embodiment. The mobile terminal 102 can make different categories of emergency calls, having a plurality of different respective functions, to the radio network subsystem 128 (see FIG. 1) in a wireless telecommunications network, when the user is located in a foreign country or a home country. The mobile terminal 102 is responsive to a customized emergency signal 402 having a magnitude indicative of selected emergency assistance sought by the user, and the mobile terminal is for providing a location-independent emergency transmission signal 406 that is selected from a plurality of different allowed location-independent emergency transmission signals having different respective functions. The radio network subsystem 128 is responsive to the location-independent emergency transmission signal 406, and is for providing to the mobile terminal 102 an emergency response signal 408. The customized emergency signal 402 is selected by the user from a plurality of allowed emergency user input signals in a manner that is programmably customized to suit the user and in a manner that need not change as a result of the mobile terminal 102 being taken from one country to another.

The radio network subsystem 128 includes a base station 114 in direct wireless communication with the mobile terminal 102 over a wireless interface, and a radio network controller 112 in communication with the base station 114 This is shown by both FIG. 1 and by FIG. 4.

If the location-independent emergency transmission signal 406 contains a service category, then the emergency response signal 408 will include the downlink portion of a call between the user and a specific type of emergency center. The emergency center, of course, will be chosen so as to correspond geographically to the base station with which the mobile terminal is communicating, and also so as to correspond to the service category.

The system shown in FIG. 4 also includes an emergency center 410 communicating with the user via the radio network subsystem 128. The radio network subsystem 128 establishes the communication between the user and the emergency center, and may do this by translating the location-independent emergency transmission signal 406 into a corresponding local telephone call.

It will also be understood by those skilled in the art that the blocks and signal depicted in the Figures may be rearranged in numerous and sundry ways, without departing from the scope of this invention, and that these blocks represent combinations of hardware and software which can be implemented in a variety of ways, and furthermore that these signals represent general cause and effect relationships without precluding intervening occurrences and suchlike.

Although this invention has been shown and described with respect to a best mode embodiment thereof, it should be understood by those skilled in the art that the foregoing and various other changes, omissions and additions in the form and detail thereof may be made therein while adhering to the spirit of the invention.

What is claimed is:

1. A method for providing an emergency call by a user of a mobile phone to a mobile phone network, comprising the steps of:
   inputting an emergency call number into a mobile phone; and
   attaching to the emergency call number a location-independent emergency service category that is identified by each mobile network in the same way,
   wherein the method also comprises the steps of:
      providing an emergency call code alpha tag identifier,
      obtaining from the mobile phone emergency information, and
      choosing the location-independent emergency service category.

2. A method according to claim 1, wherein the available emergency services are stored within the mobile phone or within a universal subscriber identity module located within the mobile phone.

3. A method according to claim 2, wherein the method further comprises the step of after a predetermined time providing an emergency call having the emergency call number and the location-independent emergency service category attached thereto to the mobile network if an alternative emergency call number is not selected by the user.

4. A method according to claim 2, wherein the method further comprises the step of automatically routing the emergency call to a corresponding emergency call center in the mobile network.

5. A method according to claim 2, wherein the method further comprises the step of maintaining an emergency call code data file in the mobile phone.

6. A method according to claim 5, wherein the emergency call code data file stores the location-independent emergency service category, the emergency call code and an emergency call code alpha tag identifier.

7. A method according to claim 6, wherein the method further comprises the step of using a smart card for storing the emergency call code data file.

8. A method according to claim 1, wherein the method further comprises the step of maintaining an emergency call code data file in the mobile phone.

9. A method according to claim 1, wherein the location-independent emergency service category identifies emergencies, including general rescue, police ambulance, fire, or a combination thereof.

10. A method according to claim 1, wherein the method further comprises the step of attaching to an emergency call code an emergency call code alpha tag identifier for scrolling available emergency services.

11. A method according to claim 1, wherein the method further comprises the step of scrolling a display of the mobile phone for available emergency services in case the emergency number entered did not correspond to a desired emergency service.

12. A mobile terminal (102) for allowing a user to make different categories of emergency calls having a plurality of different respective functions, to a radio network subsystem in a wireless telecommunications network, when the user is located in a foreign country or a home country, comprising:
   a data file and call conversion circuit (302) for providing a location-independent emergency signal (304), responsive to a customized emergency user input signal (306) having a magnitude indicative of a user seeking selected emergency assistance, wherein required emergency user input does not change when the mobile terminal (102) is taken across an international border;
   a transmit and receive device (308), responsive to the location-independent emergency signal (304), for providing an outgoing transmission signal (310),
   wherein the customized emergency user input signal (306) is selected from a plurality of allowed emergency user input signals that are programmably customized to suit the user, and
   wherein the location-independent emergency signal (304) is selected from a plurality of different allowed location-independent emergency signals having different respective functions effectuated by the outgoing transmission signal (310), and
   wherein an alpha identifier enables the user to obtain from the mobile phone emergency information.

13. The mobile terminal (102) of claim 12, further comprising:
   a microphone (314), responsive to audio input from the user, for providing a user voice signal (316); and
   a speaker (318), responsive to an incoming voice signal (320), for providing audio output to the user,
   wherein the incoming voice signal (320) contains information from a general emergency center corresponding to a base station that is communicating with the user over a wireless interface, and
   wherein the mobile terminal (102) further comprises a display screen (322), responsive to a display signal (324) which is initiated by the user and has a signal component indicative of the alpha identifier, the display screen (322) being for providing the user with at least one emergency services display containing emergency call information to assist the user in selecting the customized emergency user input signal (306).

14. The mobile terminal (102) of claim 13, further comprising a keypad (326) for providing the customized emergency user input signal (306) in response to customized emergency input.

15. The mobile terminal (102) of claim 13, wherein the display signal (324) is provided by the data file and call conversion circuit (302).

16. The mobile terminal (102) of claim 15, wherein the display screen (322) displays information about how to get help regarding police, ambulance, and fire.

17. The mobile terminal of claim 15, wherein the call is automatically routed to the general emergency center if the user does not respond to the at least one displayed emergency service within a defined time.

18. The mobile terminal (102) of claim 15, wherein an emergency call code file is stored in a smart card which is removable from the mobile terminal, and wherein the emergency call code file provides information about the emergency call code, the alpha identifier and the service category.

19. The mobile terminal (102) of claim 15, wherein the display screen (322) displaying the at least one emergency services display allows the user to automatically place a call by selecting an emergency service.

20. The mobile terminal (102) of claim 13, wherein the data file and call conversion circuit (302) is a programmable smart card which is removably located in the mobile terminal (102).

21. The mobile terminal (102) of claim 12, further comprising:
   a microphone (314), responsive to audio input from the user, for providing a user voice signal (316); and
   a speaker (318), responsive to an incoming voice signal (320), for providing audio output to the user,
   wherein the incoming voice signal (320) contains information from a specific type of emergency center corresponding to a base station that is communicating with the user over a wireless interface, if the location-independent emergency signal (304) includes an emergency call code, and also includes a service category indicating the type of emergency call.

22. The mobile terminal (102) of claim 21, wherein the specific type of emergency center is selected by the user from a group which at least consists of police, ambulance, and fire department.

23. The mobile terminal (102) of claim 22, further comprising an emergency button (328) for providing the customized emergency user input signal (306) in response to user input, and wherein the specific type of emergency center is an ambulance facility.

24. The mobile terminal (102) of claim 21, wherein the call is automatically routed to a general emergency center if the user does not respond to the at least one emergency service displayed within a defined time.

25. The mobile terminal (102) of claim 21, wherein an unsuccessful call to the general emergency center is automatically routed to a backup specific type of emergency center which corresponds to the base station that is communicating with the user over the wireless interface.

26. The mobile terminal (102) of claim 12, wherein the transmit and receive device (308) is also for providing a distress signal that can be used by emergency personnel to home in on the mobile terminal, when the data file and call conversion circuit (302) provides the location-independent emergency signal (304).

27. A system for allowing a mobile terminal (102) to make different categories of emergency calls, having a plurality of different respective functions, to a radio network subsystem (128) in a wireless telecommunications network, when the user is located in a foreign country or a home country, comprising:
   a mobile terminal (102), responsive to a customized emergency signal (402) having a magnitude indicative of selected emergency assistance sought by the user, for providing a location-independent emergency transmission signal (406) that is selected from a plurality of different allowed location-independent emergency transmission signals having different respective functions; and
   a radio network subsystem (128), responsive to the location-independent emergency transmission signal (406), for providing to the mobile terminal (102) an emergency response signal (408),
   wherein the customized emergency signal (402) is selected by the user from a plurality of allowed emergency user input signals in a manner that is programmably customized to suit the user and in a manner that does not change when the mobile terminal (102) is taken across international borders,
   wherein the radio network subsystem (128) further comprises a base station (114) in direct wireless communication with the mobile terminal (102) over a wireless interface, and a radio network controller (112) in communication with the base station (114), and
   wherein the customized emergency signal (402) is user-selected when the user causes an alpha identifier to elicit emergency information which will be displayed for the user.

28. The system of claim 27, wherein the location-independent emergency transmission signal (406) contains an emergency call code having a magnitude indicative of an emergency.

29. The system of claim 28, wherein the location-independent emergency transmission signal (406) also contains the alpha identifier, and wherein the emergency response signal (408) includes emergency information which the user can display and scroll through.

30. The system of claim 27, further comprising an emergency center (410) for communication with the user via the radio network subsystem (128), wherein the radio network subsystem (128) establishes the communication by translating the location-independent emergency transmission signal (406) into a corresponding local telephone call.

31. The system of claim 28, wherein the location-independent emergency transmission signal (406) also contains a service category, and wherein the emergency response signal (408) includes a downlink portion of a call between the user and a specific type of emergency center corresponding to the base station (114) and also corresponding to the service category.

32. A smart card operational within a mobile terminal in a wireless communication network, the smart card comprising an emergency call code file that further comprises an emergency call code, an alpha identifier, and a service category which are location-independent, wherein the emergency call code file is for translating emergency data from a format which was input by a user into a format that is location-independent, wherein the alpha identifier enables the user to obtain from the mobile terminal emergency information and choose the location-independent emergency service category.

33. A mobile phone for providing an emergency call to a mobile phone network, comprising:
   means for inputting an emergency call number into the mobile phone; and
   means for attaching to the emergency call number a location-independent emergency service category that is identified by each mobile network in the same way,
   wherein the mobile phone also comprises:
      means for providing an emergency call code alpha tag identifier;
      means for a user to obtain from the mobile phone emergency information; and
      means for choosing the location-independent emergency service category.

* * * * *

UNITED STATES PATENT AND TRADEMARK OFFICE
CERTIFICATE OF CORRECTION

PATENT NO. : 6,766,159 B2
DATED : July 20, 2004
INVENTOR(S) : R. Lindholm

It is certified that error appears in the above-identified patent and that said Letters Patent is hereby corrected as shown below:

Title page,
Item [56], References Cited, U.S. PATENT DOCUMENTS, please insert the following:

-- 6,169,911    1/2001    Wagner et al.
       6,266,523    7/2001    Cook et al.
       6,314,281   11/2001   Chao et al.
       6,330,454   12/2001   Verdonk
       6,411,822    6/2002    Kraft --.

Signed and Sealed this

Twenty-eighth Day of September, 2004

JON W. DUDAS
*Director of the United States Patent and Trademark Office*